United States Patent [19]

Sperinck et al.

[11] Patent Number: 4,668,153

[45] Date of Patent: May 26, 1987

[54] APPARATUS FOR POSTING MATERIALS INTO AND OUT OF ENCLOSURES

[75] Inventors: William A. Sperinck, Warrington; Keith C. Ashcroft, Chorley, both of England

[73] Assignee: British Nuclear Fuels, Warrington, England

[21] Appl. No.: 791,554

[22] Filed: Oct. 25, 1985

[30] Foreign Application Priority Data

Nov. 7, 1984 [GB] United Kingdom ................. 8428181

[51] Int. Cl.⁴ .............................................. B65G 65/00

[52] U.S. Cl. .................................... 414/411; 212/166; 376/203; 376/262; 376/272; 414/146; 414/217; 414/684.3

[58] Field of Search ............ 414/146, 217, 411, 684.3; 212/166; 376/203, 262, 268, 269, 272

[56] References Cited

U.S. PATENT DOCUMENTS

| | | | |
|---|---|---|---|
| 3,955,692 | 5/1976 | Cody et al. | 414/146 X |
| 4,332,640 | 6/1982 | Chertock et al. | 414/146 X |
| 4,412,771 | 11/1983 | Gerlach et al. | 414/217 |
| 4,534,389 | 8/1985 | Tullis | 414/217 X |

FOREIGN PATENT DOCUMENTS

| | | | |
|---|---|---|---|
| 1196305 | 7/1965 | Fed. Rep. of Germany | 414/146 |
| 2038920 | 7/1980 | United Kingdom . | |
| 2038921 | 7/1980 | United Kingdom . | |
| 2102719 | 2/1983 | United Kingdom . | |

*Primary Examiner*—Leslie J. Paperner
*Assistant Examiner*—David A. Bucci
*Attorney, Agent, or Firm*—William R. Hinds

[57] ABSTRACT

An apparatus for posting materials into and out of an enclosure through a port in a wall of the enclosure. A container for the materials has a lid engageable with a door for the port and the container is supported in a cradle. An interlock bar extends between the port and a clamp assembly for the container, the bar being axially displaceable between first and second positions. In the first position of the bar one end thereof arrests movement of a door release mechanism and the bar is locked against axial displacement in the absence of a container in the cradle. In the second position of the bar the opposite end thereof engages and locks the clamp assembly for maintaining the container at the port.

6 Claims, 4 Drawing Figures

APPARATUS FOR POSTING MATERIALS INTO AND OUT OF ENCLOSURES

BACKGROUND OF THE INVENTION

The present invention concerns apparatus for posting toxic or radioactive materials into and out of a high integrity enclosure, such as a glove-box, through a port in a wall of the enclosure.

FEATURES AND ASPECTS OF THE INVENTION

According to the present invention an apparatus of the above kind comprises a container for the materials having a removable lid at one end, a cradle for receiving the container mounted at the port for presenting said one end to the port, a normally closed door for the port releasably engageable with the lid such that with the container present at the port the door and lid are moveable as a unit away from the port to permit communication through the port between the enclosure and the container, and means to prevent opening of the door in the absence of a container in the cradle and to prevent removal of the container when the door and lid unit is away from the port, said means including an interlock bar extending between the port and a clamp assembly for the container on the cradle, the bar being axially displaceable between a first position at which one end thereof arrests movement of a door release mechanism and the bar is locked against axial displacement in the absence of a container in the cradle and a second position in which the opposite end of the bar engages and locks the clamp assembly for maintaining the container at the port.

In the absence of the container in the cradle the interlock bar can be locked against axial displacement by means of a spring-loaded plunger extending through a slot in the bar and having an enlarged diameter portion urged into engagement with a cooperating recess in the bar. In the presence of a container the plunger is depressed to disengage the enlarged diameter portion from the recess to thereby release the interlock bar.

Conveniently, the opposite end of the interlock bar is maintained in its second position by means of a further spring-loaded plunger operable to prevent return of the interlock bar into its first position on withdrawal of the door release mechanism.

The lid can be removably secured in the end of the container by a plurality of radial plungers slidable in the lid and urged outwardly into engagement with the container by a profiled spring-loaded axial plunger disposed in the lid, the axial plunger being depressed by means on the door to permit withdrawal of the radial plungers out of engagement with the container.

DESCRIPTION OF THE DRAWINGS

The invention will be described further, by way of example, with reference to the accompanying drawings; in which.

DESCRIPTION OF THE PREFERRED EMBODIMENT

Figure 1:
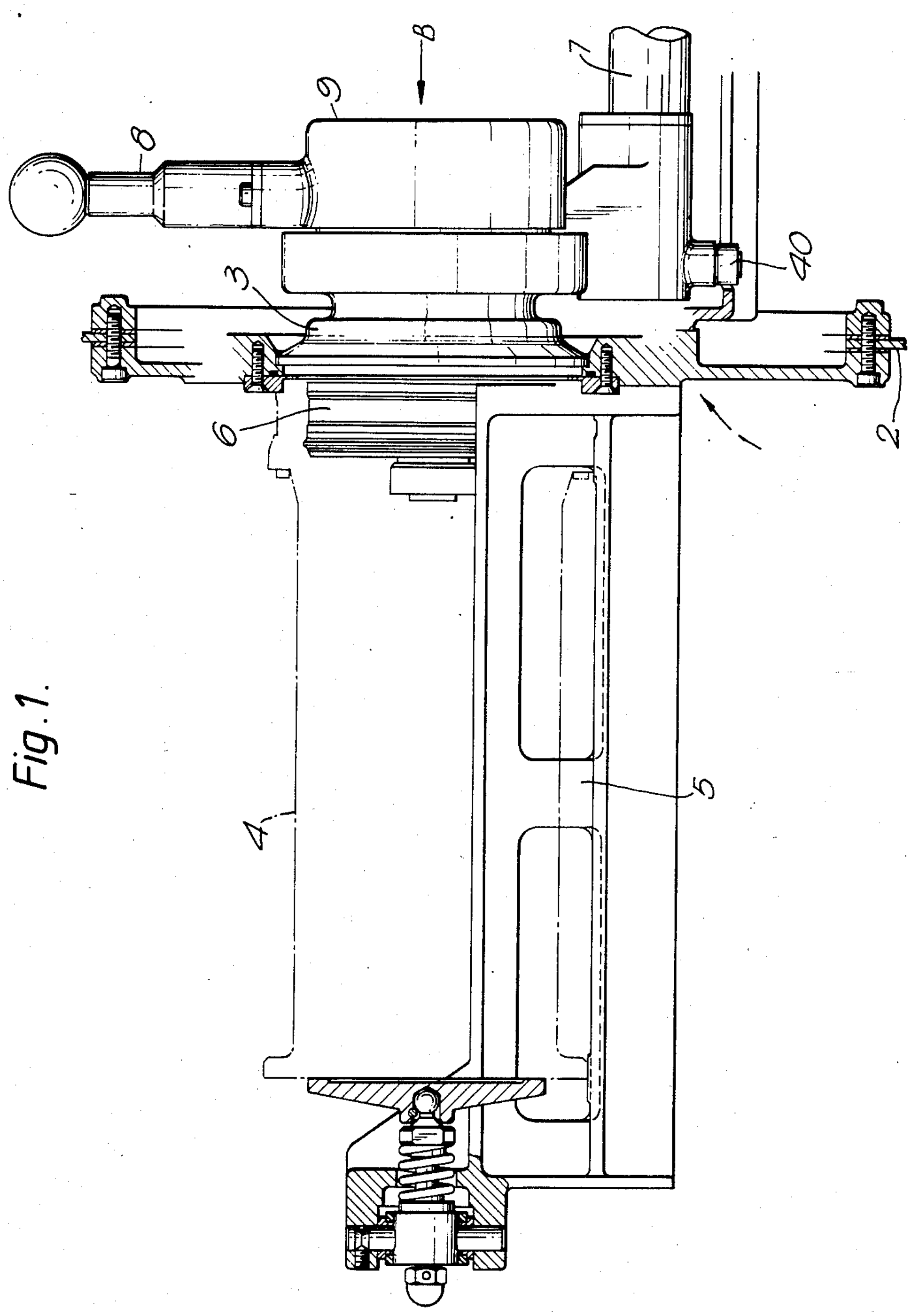
FIG. 1 is a general view of a posting apparatus according to the invention.
Figure 2:
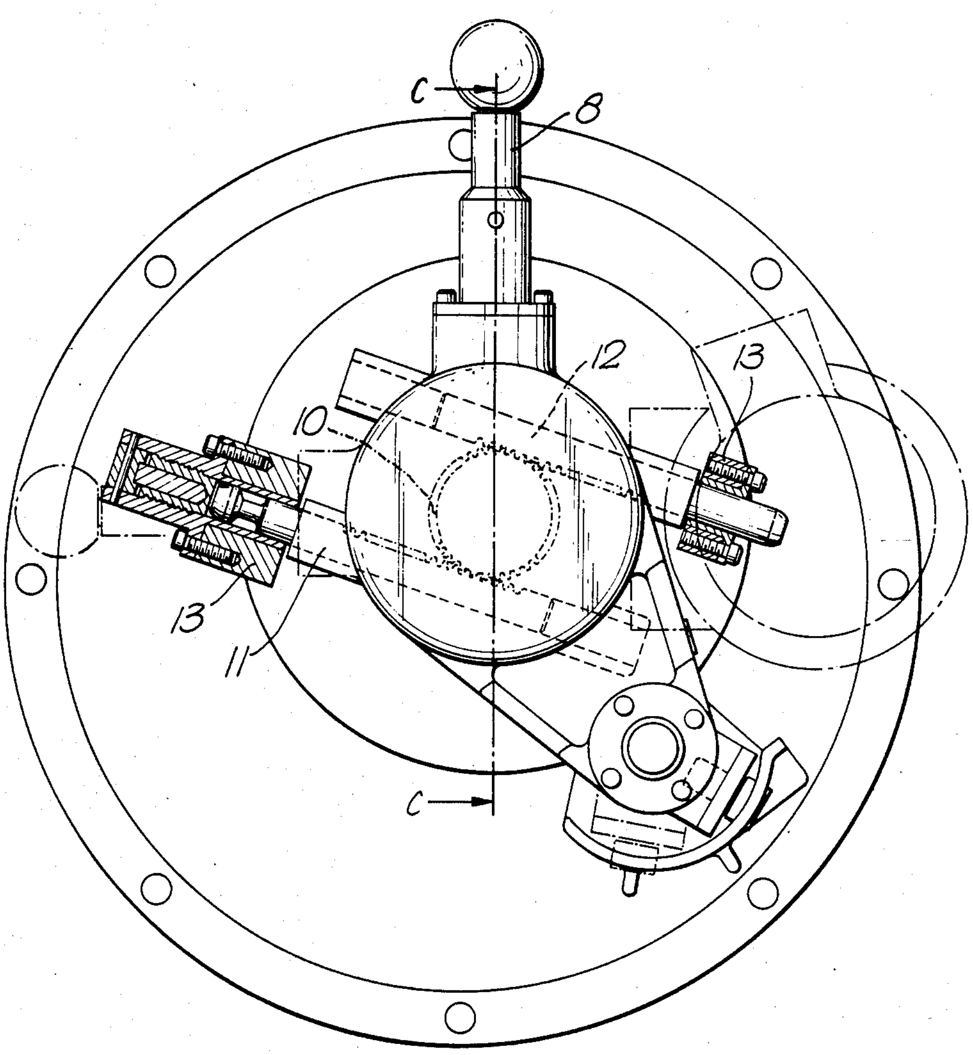
FIG. 2 is a view in the direction B in FIG. 1.

With reference first to FIG. 1, a port 1 providing an opening in a wall 2 of a glove-box or the like enclosure provides communication between the exterior of the glove-box (to the left of the wall 2 in FIG. 1) and the interior of the glove-box (to the right of the wall 2 in FIG. 1). The port 1 is normally closed by a door 3 operable from the interior of the glove-box and which, when closed, effects a seal at the port 1. A container 4 to receive objects to be transferred into or out of the glove-box is presented to the port 1 by means of a cradle 5 mounted at the port at the exterior of the glove-box. The container 4 is provided with a lid 6 which cooperates with the door 3 and the arrangement is such that the door 3 can only be opened when a container is both presented to and clamped to the port and likewise the container 4 can only be removed from the port when the door 3 is closed and container unclamped.

Figure 3:
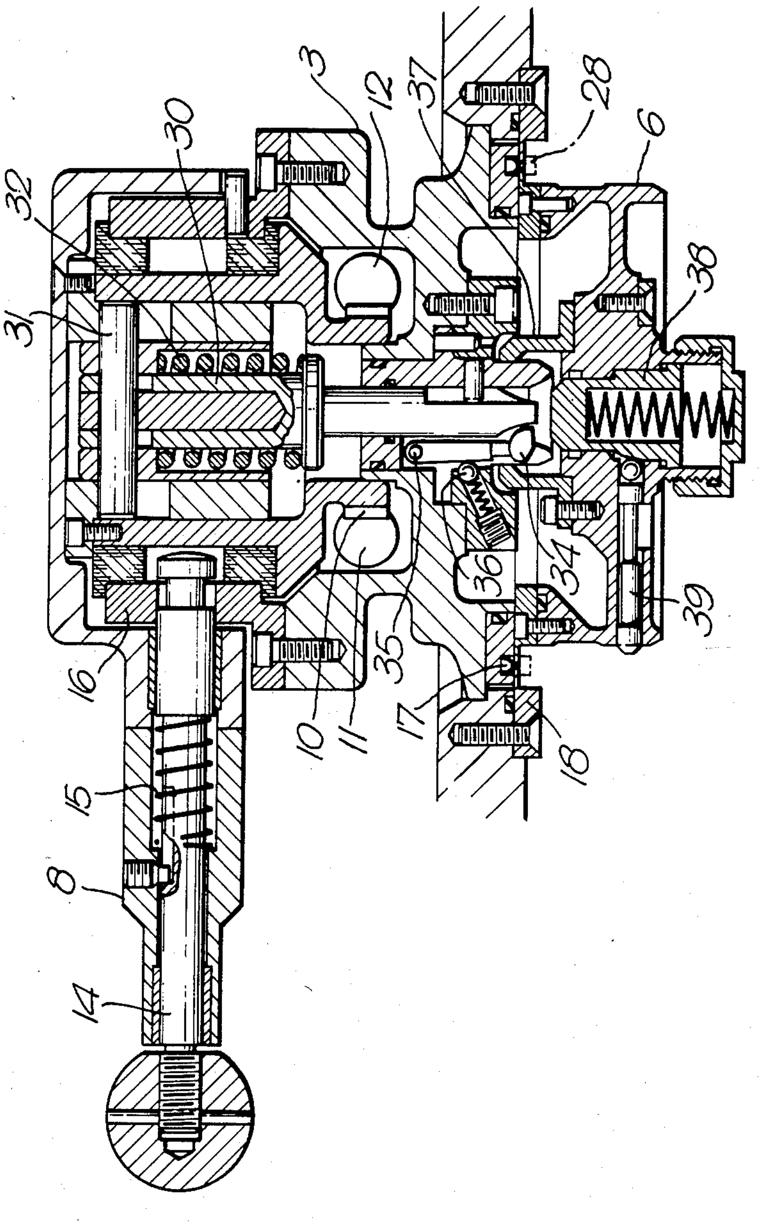
FIG. 3 is a section on C—C in FIG. 2 and turned through 90°.

The door 3 is slidably and rotatably mounted on a shaft 7 and is operated by means of a handle 8. The handle 8 extends radially from a housing 9 which contains an annular pinion 10 cooperable with rack plungers 11 and 12. In a closed position of the door the ends of the plungers 11 and 12 engage retainers 13 at the port. The handle 8 includes a slidable plunger 14 terminating in a knob. The plunger 14 (FIG. 3) is urged radially inwardly by means of a spring 15 located about the plunger 14 in a counterbored length of the handle 8. The free end of the plunger 14 engages a detent position in a sleeve 16 mounted on the door 3.

Figure 4:
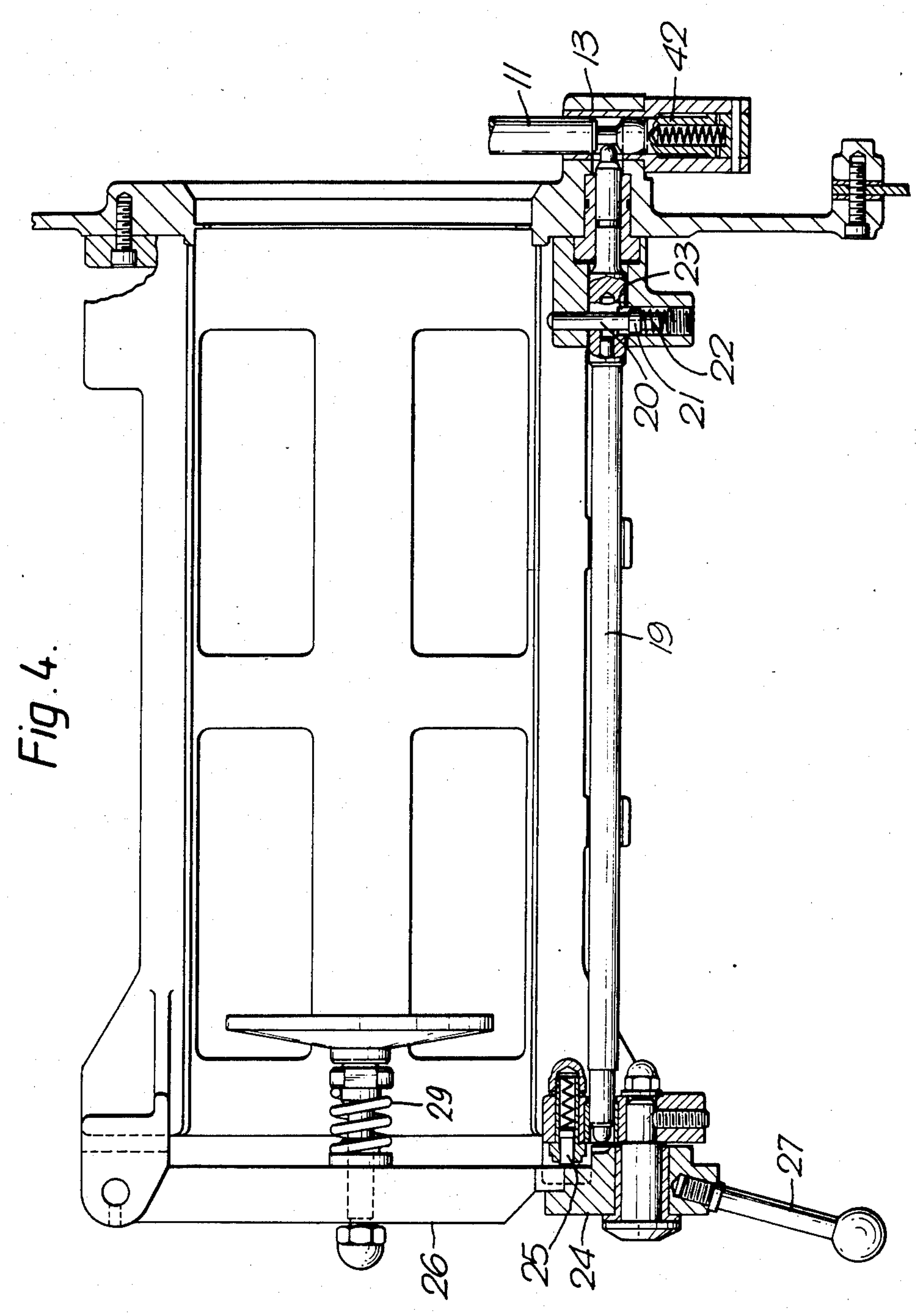
FIG. 4 is an alternative view of a part of the posting apparatus.

Prior to presenting the container 4 to the port and with the door 3 closed the rack plungers 11 and 12 engage their respective retainers 13 to compress a seal 17, conveniently a rubber seal, against a seal ring 18 at the port opening. In this position, and with reference to FIG. 4, an interlock bar 19 is in a forward position and engages the rack plunger 11 thereby preventing rotation of the handle 8 and ensuring that the door 3 is secured in its closed position. The interlock bar 19 is secured against movement by means of a spring-loaded plunger 20 which projects through a slot in the bar 19 and has a collar 21 which, in the absence of a container in the cradle, is urged by spring 22 into a counterbore 23 in the bar 19. A clamp cam 24 at the end of the cradle remote from the door 3 is in an open position and a spring-loaded pin 25 functions to prevent rotation of the clamp cam 24 upon release of clamp arm 26 in the absence of a container in the cradle.

Upon loading container 4 into the cradle 5 the clamp arm 26 is closed on to the rear end of the container to thereby urge the opposite lidded end of the container into sealing engagement at the port opening. Handle 27 is rotated through 90° to cause clamp cam 24 to depress the spring-loaded pin 25 and thereby secure the clamp arm 26. In this position a detent position on the clamp cam 24 is aligned with the end of the interlock bar 19. A seal 28, again preferably a rubber seal, at the lidded end of the container is compressed against the seal 17 in the door by means of a spring 29 on the clamp arm 26. The forward movement of the container into sealing engagement at the port opening causes the plunger 20 to be depressed to thereby release the interlock bar 19.

With the container in position at the port opening the plunger 14 in the door handle 8 is pulled radially outwards to clear the detent position in the sleeve 16. This a safety feature to prevent accidental release of the container lid. The handle 8 is then indexed 22½° anticlockwise and the plunger 14 is pulled further radially outwards such that the end of the plunger is withdrawn from the sleeve 16. In addition to effecting rotation of the pinion 10 to displace the rack plungers 11 and 12, the indexing of the handle 8 causes an axial displacement of a spring-loaded plunger 30 due to a scroll connection between the pinion and a retainer 31 for spring 32 of the plunger 30. During the initial indexing of the handle the plunger 30 advances a certain distance which can be 2 mm. and the plungers 11 and 12 can stroke approximately 9.5 mm.

Upon further indexing of the handle through 45° and in the same direction the plunger 14 in the handle 8 springs radially inwards into the sleeve 16. The plunger 30 advances a further 4 mm and the rack plungers 11 and 12 stroke approximately 19 mm. The advance of the plunger 30 displaces locking levers 34, which are pivotable about their ends 35 and each urged by a spring-loaded sphere 36 into engagement with the plunger 30, into a retaining ring 37 mounted on the lid 6. This effectively locks the container lid 6 to the door 3 whilst maintaining the seal therebetween. The advance of the plunger 30 also depresses a further spring-loaded plunger 38 in the container lid 6. The plunger 38 normally maintains three equiangularly spaced radial retaining plungers 39 slidable in the lid 6 in engagement with cooperating recesses in the wall of the container to secure the lid in the end of the container. Depression of the plunger 38 allows the plungers 39 to slide radially inwardly due to the shaped profile of the plunger 38 thereby to release the lid from the container.

The plunger 14 in the handle 8 is then pulled radially outwards and the handle is indexed in the same direction as before through a further 22½°. When released the plunger 14 springs radially inwards into a further detent position in the sleeve 16. This further indexing of the handle effects a further 2 mm stroke of the plunger 30 and the rack plungers 11 and 12 move through a further 9.5 mm to clear and be fully withdrawn from the retainers 13. The handle 8 has been indexed through a total of 90°. The door 3 and the lid 6 are coupled together and can now be withdrawn as a unit by sliding along shaft 7 to expose the port opening and to provide communication between the interior of the glove box and the interior of the container. A roller 40 on the door mounting runs in a cam slot whereby the door and lid unit swing laterally away from the port opening in sliding along the shaft 7. The angle of swing can be in the region of 70°.

During the withdrawal of the rack plunger 11 the interlock bar 19 is displaced such that its end remote from the rack plunger 11 engages a detent position in the clamp cam 24 to thereby lock the clamp cam against movement to prevent removal of the container in the absence of the door 3 at the port opening. The interlock bar 19 is maintained in place to lock the clamp cam by means of a spring-loaded thimble 42 in the retainer for the end of the rack plunger 11. Upon removal of the rack plunger 11 from its retainer the thimble 42 assumes the position occupied by the end of the rack plunger and prevents displacement of the interlock bar.

We claim:

1. An apparatus for posting toxic or radioactive materials into and out of a high integrity enclosure through a port in a wall of the enclosure comprising a container for the materials, a removable lid at one end of the container, a cradle for receiving the container mounted at the port for presenting said one end to the port, a normally closed door for the port releasably engageable with the lid such that with the container present at the port the door and lid are moveable as a unit away from the port to permit communication through the port between the enclosure and the container, and means to prevent opening of the door in the absence of a container in the cradle and to prevent removal of the container when the door and lid unit is away from the port, said means including an interlock bar extending between the port and a clamp assembly for the container on the cradle, the bar being axially displaceable between a first position at which one end thereof arrests movement of a door release mechanism and the bar is locked against axial displacement in the absence of a container in the cradle by means of a spring-loaded plunger extending through a slot in the bar and having an enlarged diameter portion urged into engagement with a cooperating recess in the bar, and a second position in which the opposite end of the bar engages and locks the clamp assembly for maintaining the container at the port.

2. An apparatus as claimed in claim 1 including a further spring-loaded plunger operable when the interlock bar is in its second position to prevent return of the interlock bar into its first position on withdrawal of the door release mechanism.

3. An apparatus as claimed in claim 1 including a plurality of radial plungers slidable in the lid and urged outwardly into engagement with the container by a profiled spring-loaded axial plunger disposed in the lid.

4. An apparatus as claimed in claim 3 including means on the door operable to depress the axial plunger to permit withdrawal of the radial plungers out of engagement with the container.

5. An apparatus as claimed in claim 2 including a plurality of radial plungers slidable in the lid and urged outwardly into engagement with the container by a profiled spring-loaded axial plunger disposed in the lid.

6. An apparatus as claimed in claim 5 including means on the door operable to depress the axial plunger to permit withdrawal of the radial plungers out of engagement with the container.

* * * * *